Nov. 22, 1966 F. G. HEWITT 3,287,712

NONDESTRUCTIVE READOUT MEMORY

Filed Dec. 19, 1962 2 Sheets-Sheet 1

INVENTOR
FREDERICK G. HEWITT
BY Herbert F. [signature]
ATTORNEY

Nov. 22, 1966 F. G. HEWITT 3,287,712

NONDESTRUCTIVE READOUT MEMORY

Filed Dec. 19, 1962 2 Sheets-Sheet 2

INVENTOR
FREDERICK G. HEWITT
BY Herbert T. [signature]
ATTORNEY

United States Patent Office 3,287,712
Patented Nov. 22, 1966

3,287,712
NONDESTRUCTIVE READOUT MAGNETIC MEMORY

Frederick G. Hewitt, Egan Township, Dakota County, Minn., assignor to Sperry Rand Corporation, New York, N.Y., a corporation of Delaware

Filed Dec. 19, 1962, Ser. No. 245,772
4 Claims. (Cl. 340—174)

This invention relates in general to a memory apparatus and in particular to such an apparatus that utilizes a bistable, high remanent-magnetization memory flux path and a low remanent-magnetization interrogate flux path.

The value of the utilization of small cores of magnetic material as logical memory elements in electronic data processing systems is well known. This value is based upon the bistable characteristic of magnetic cores which include the ability to retain or remember magnetic conditions which may be utilized to indicate a binary "1" or a binary "0." As the use of magnetic cores in electronic data processing equipment increases, a primary means of improving the computational speed of these machines is to utilize memory elements which possess the property of nondestructive readout, for by retaining the initial state of remanent magnetization after readout the rewrite cycle required with destructive readout device is eliminated. As used herein, the term "nondestructive readout" shall refer to the sensing of the relative directional-state of the remanent magnetization of a magnetic core without destroying or reversing such remanent magnetization. This should not be interpreted to mean that the state of the remanent magnetization of the core being sensed is not temporarily disturbed during such nondestructive readout.

Ordinary magnetic cores and circuits utilized in nondestructive readout devices are now so well known that they need no special description herein. However, for purposes of the present invention, it should be understood that such magnetic cores are capable of being magnetized to saturation in either of two directions. Furthermore, these cores are formed of magnetic material selected to have a rectangular hysteresis characteristic which ensures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient magnitude through the input winding in a manner so as to set up a magnetic field in the area of the magnetic core in a sense opposite to the preexisting flux direction, thereby driving the core to saturation in the opposite direction of polarity, i.e., of positive to negative saturation. When the core switches, the resulting magnetic field variation induces a signal on the other windings on the core such as, for example, the above mentioned output or sense winding. The magnetic material for the core may be formed of various magnetic materials such as those known as Mumetal, Permalloy, or the ferromagnetic ferrites such as that known as Ferramic.

One technique of achieving destructive readout of a toroidal bistable memory core is that of the well-known coincident current technique. This method utilizes the threshold characteristic of a core having a substantially rectangular hysteresis characteristic. In this technique, a minimum of two interrogate lines threads the core's central aperture each interrogate line setting up a magnetomotive force in the memory core of one half of the magnetomotive force necessary to completely switch the memory core from a first to a second and opposite magnetic state while the magnetomotive force set up by each separate interrogate winding is of insufficient magnitude to effect a substantial change in the memory core's magnetic state. A sense winding threads the core's central aperture and detects the memory core's substantial or insubstantial magnetic state change as an indication of the information stored therein.

One technique of achieving nondestructive readout of a magnetic memory core is that disclosed in the article "Nondestructive Sensing of Magnetic Cores," Transactions of the AIEE, Communications on Electronics, Buck and Frank, January 1954, pp. 822–830. This method utilizes a bistable magnetic toroidal memory core having write and sense windings which thread the central aperture with a transverse interrogate field, i.e., an externally applied field directed across the core's internal flux applied by a second low remanent-magnetization magnetic toroidal core having a gap in its flux path into which one leg of the memory core is placed. Application of an interrogate current signal on the interrogate winding threading the interrogate core's central aperture sets up a magnetic field in the gap which is believed to cause a temporary rotation of the flux of the memory core in the area of the interrogate core's air gap. This temporary alteration of the memory core's remanent magnetic state is detected by the sense winding, the polarity of the output signal being indicative of the information stored in the memory core.

Another technique of achieving nondestructive readout of a magnetic memory core is that disclosed in the article "The Transfluxor," Rajchman and Lo, Proceedings of the IRE, March 1956, pp. 321–332. This method utilizes a "transfluxor" which comprises a core of magnetic material of a susbtantially rectangular hysteresis characteristic having at least a first large aperture and a second small aperture therethrough. These apertures form three flux paths: the first defined by the periphery of the first aperture; a second defined by the periphery of the second aperture; and, a third defined by the flux path about both peripheries. Information is stored in the magnetic sense of the flux in path 1 with nondestructive readout of the information stored in path 1 achieved by coupling an interrogate current signal to an interrogate winding threading aperture 2 with readout of the stored information achieved by a substantial or insubstantial change of the magnetic state of path 2. Interrogation of the transfluxor as disclosed in the above article requires an unconditional reset current signal to be coupled to path 2 to restore the magnetic state of path 2 to its previous state if switched by the interrogate current signal.

A still further technique of achieving a nondestructive readout of the magnetic memory core is that disclosed in the article "Fluxlock-High Speed Core Memory," Instruments and Control Systems, Robert M. Tillman, May 1961, pp. 866–869. This method utilizes a bistable magnetic toroidal memory core having write sense windings threading the core's central aperture and an interrogate winding wound about the core along a diameter of the core. Information is stored in the core in conventional manner. Interrogation is achieved by coupling an interrogate current signal to the interrogate winding causing a temporary alteration of the core's magnetic state. Readout of the stored information is achieved by a bipolar output signal induced in the sense winding the polarity phase of the readout signal indicating the information stored therein.

This invention achieves nondestructive readout of a magnetic memory core by the use of a closed flux path magnetic memory core of a high remanent-magnetization and having at least one additional interrogation leg of a low remanent-magnetization. Flux induced in the interrogation leg by an interrogate current signal flowing through an interrogate winding coupled thereto, temporarily alters the remanent magnetization of the memory core at the juncture of the memory core and the interrogate leg. A sense winding coupled to the memory core at such juncture has a bipolar output signal induced therein due to said temporary alteration of said memory core's remanent magnetization, the phase of said bipolar output signal being indicative of the information stored in the memory core.

Accordingly, it is the primary object of this invention to provide a new and novel nondestructive readout magnetic memory element.

Another object of this invention is to provide a nondestructive readout magnetic memory element having a high remanent-magnetization flux path and a low remanent-magnetization flux path.

Another object of this invention is to provide a nondestructive readout magnetic element wherein the binary information is stored in a high remanent-magnetization flux path and an interrogation field induced in a low remanent-magnetization flux path only temporarily effects the magnetic state of the high remanent-magnetization flux path so as to provide an indication of the information stored therein.

A still further object of this invention is to provide a unitary nondestructive readout magnetic memory element having a first closed flux path and a second open flux path whereby the magnetization of the first path is only temporarily altered by a temporary interrogation flux in said second path so as to provide an indication of the information stored in said first path.

These and other more detailed and specific objectives will be disclosed in the course of the following specification, reference being had to accompanying drawings, in which:

FIG. 1*a* illustrates a preferred embodiment of the nondestructive readout magnetic memory element disclosed by this specification.

FIG. 1*b* illustrates an alternate embodiment of the element of FIG. 1*a*.

FIG. 2*a* illustrates an additional embodiment of a nondestructive readout magnetic memory element disclosed by this specification.

FIG. 2*b* illustrates an alternate embodiment of the element of FIG. 2*a*.

Figure 1B:
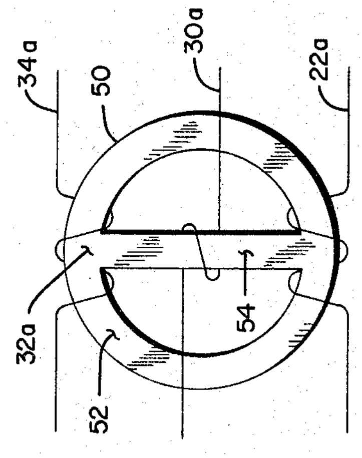
Figure 1A:
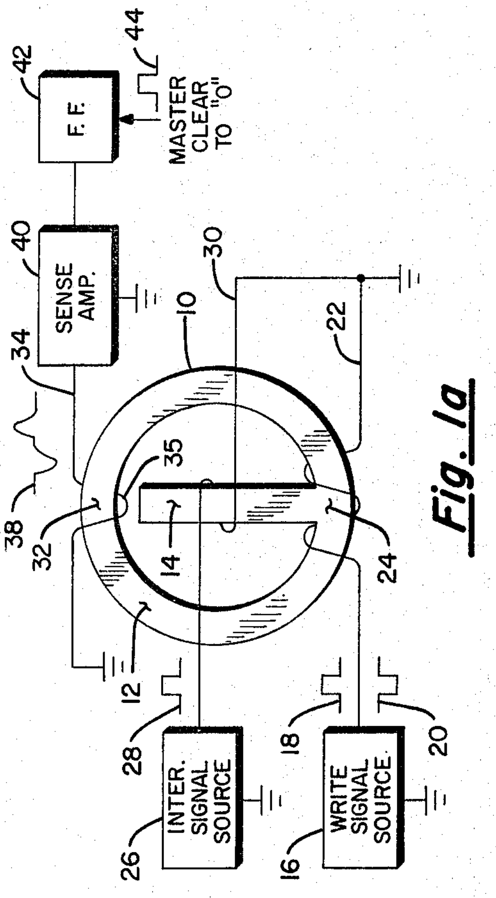

Reference to FIG. 1*a* shows a core 10 having a high remanent-magnetization toroidal flux path 12 and low remanent-magnetization leg 14. Write signal source 16 couples write "1" pulse 18 and write "0" pulse 20 to write winding 22 which is wound about the junction 24 of path 12 and leg 14. Write "1" pulse 18 causes path 12 magnetization to assume a clockwise stored "1" magnetic state while write "0" pulse 20 causes path 12 magnetization to assume a counterclockwise stored "0" magnetic state. Interrogate signal source 26 couples interrogate pulse 28 to interrogate winding 30 which is wound about leg 14 producing the interrogate flux which effects a temporary alteration of the remanent magnetic flux state in the area 32 of path 12.

Sense winding 34 couples output signal 36 indicative of a stored "1" or output signal 38 indicative of a stored "0" to sense amplifier 40 which couples a set "1" signal to flip-flop 42 only upon receipt of output signal 36. Prior to memory element operation flip-flop 42 would have been initially cleared to a "0" by master clear pulse 44, such that if output signal 38 is received by sense amplifier 40 causing no signal to be coupled to flip-flop 42, flip-flop 42 will continue holding a "0."

Figure 4:
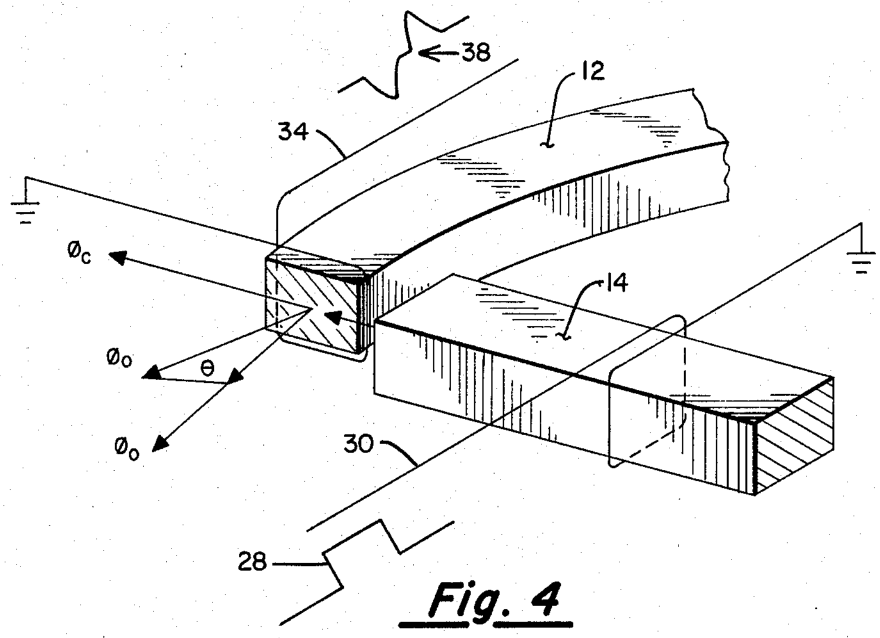
FIG. 4 is a diagrammatic illustration of the interrogate flux-memory flux interaction during interrogation.

The temporary alteration of the magnetization of path 12 of core 10 is believed to result from a "flux deflection" of the flux in path 12 when effected by the temporary interrogate flux in leg 14. Reference to FIG. 4 discloses a diagrammatic illustration of this "flux deflection" effect. Assuming a stored "0" flux condition in path 12 as depicted by flux $\phi_0$, application of interrogate pulse 28 to interrogate line 30 by pulse source 26 causes flux $\phi_c$ to flow out of leg 14 into area 32 of leg 12. This is believed to cause a localized Bloch wall switching of the flux in area 32 depicted by the rotation of the vector representation of flux $\phi_0$ through an angle $\theta$ causing a reduction of flux $\phi_0$ in area 32 of $$d\phi_0=\phi_0(1-\cos\theta)$$

This temporary alteration of the flux in area 32 produces a fluctuating magnetic field linking sense winding 34 which generates wave form 38 therein. In a similar manner it can be seen that with the magnetization of path 12 in a stored "1" flux $\phi_1$ state, interrogation of memory core 10 causes wave form 36 to be generated in sense winding 34.

Reference to FIG. 1*b* indicates another embodiment of the present invention wherein there is disclosed a magnetic memory core 50 having high remanent-magnetization flux path 52 and low remanent-magnetization leg 54. The essential difference between core 10 of FIG. 1*a* and core 50 of FIG. 1*b* is in the character of leg 14 as compared to that of leg 54. In FIG. 1*a* leg 14 is of the same material as that of path 12. However, the required low remanent-magnetization of leg 14 as compared to the high remanent-magnetization of path 12 is achieved by the air gap between leg 14 in area 32 of path 12 causing leg 14 to have a high reluctance resulting in a low remanent-magnetization.

In contrast, in magnetic memory core 50 the low remanent-magnetization of leg 54 may be caused by any one of many well-known techniques such as: different heat treatment of leg 54 as compared to that of path 52; introducing different materials into leg 54 during fabrication; using different and lower forming pressures in leg 54 as compared to path 52; using an additional bias field introduced in the area of leg 54; etc. The operation of the embodiment of FIG. 1*b* is similar to that of FIG. 1*a* as explained above.

Figure 2B:
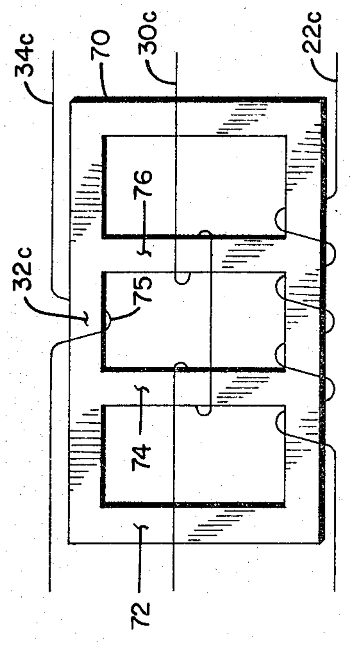
Figure 2A:
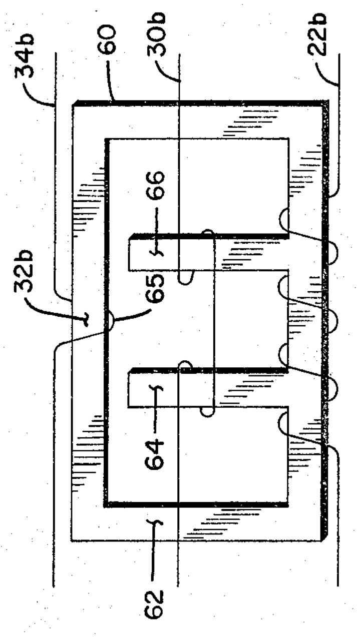
Figure 3:
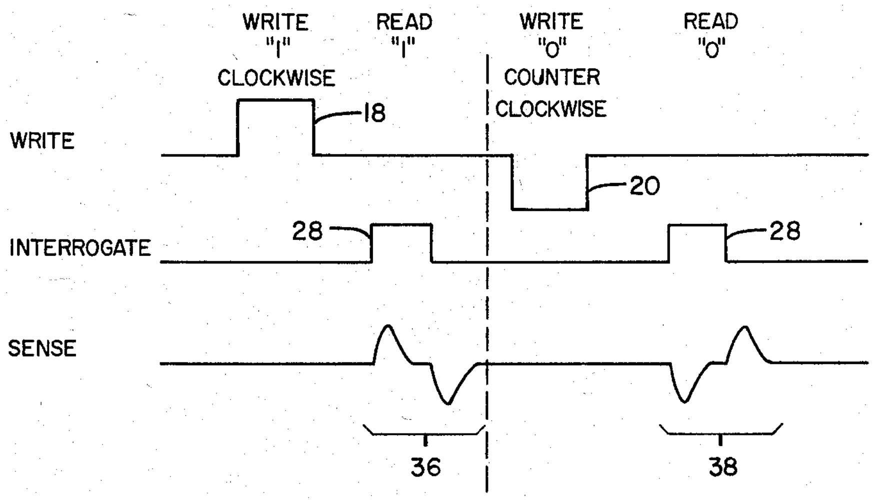
FIG. 3 illustrates typical write, interrogate and sense winding signal wave forms for the embodiments of FIGS. 1*a*, 1*b*, 2*a* and 2*b*.

Reference to FIG. 2*a* indicates another embodiment of the present invention wherein there is disclosed a magnetic memory core 60 having high remanent-magnetization flux path 62 and low remanent-magnetization legs 64 and 66. Here the operation is as explained with regard to that of FIG. 1*a*. However, in this embodiment the placement of loop 65 of sense winding **34*b* is not as critical as that of loop 35 of sense winding 34. In this embodiment the length of area 32*b* that lies between legs 64 and 66, provides a substantially more uniform zone of "flux deflection" affording a less critical placement of leg 65**.

Reference to FIG. 2*b* indicates a still further embodiment of the present invention where is disclosed a magnetic memory core 70 having high remanent-magnetization flux path 72 and low remanent-magnetization legs 74 and 76. The different reluctance of legs 74 and 76 as compared to that of flux path 72, may be achieved as with that of FIG. 1*b*. As explained above as regards FIG. 2*a*, the less critical placement of loop 75 of sense winding **34*c*** provides an efficient nondestructive readout magnetic memory element.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. A nondestructive readout magnetic memory apparatus comprising:
a magnetic core having a central aperture having a substantially high remanent-magnetization flux path thereabout for storing binary information in said core as a function of the direction of flux in said path,
at least one additional leg integral with said core having a substantially negligible remanent-magnetization,
said additional leg projecting from said central aperture's periphery across said central aperture and providing magnetic coupling between opposing portions of said core,
writing means magnetically coupled to said path at its juncture with said leg,
sensing means magnetically coupled to said path at its juncture with said leg,
interrogate means magnetically coupled to said leg,
flux induced in said leg by said interrogate means causing a temporary alteration of the flux of said path adjacent said sensing means, said temporary alteration of the flux of said path adjacent said sensing means generating an output signal in said sensing means indicative of the binary information stored in said core.

2. A nondestructive readout magnetic memory apparatus comprising:
a magnetic core having a central aperture having a substantially high remanent-magnetization flux path thereabout for storing binary information in said core as a function of the direction of flux in said path,
at least one additional leg integral with said core having a substantially negligible remanent-magnetization,
said additional leg projecting from said central aperture's periphery across said central aperture and providing magnetic coupling between opposing portions of said path,
writing means coupled to said path at its juncture with said leg,
sensing means coupled to said path at its juncture with said leg,
interrogate means coupled to said leg,
flux induced in said leg by said interrogate means causing a temporary alteration of the flux of said path adjacent said sensing means, said temporary alteration of the flux of said path adjacent said sensing means generating a bipolar output signal in said sensing means, the polarity phase of said output signal indicative of the binary information stored in said core.

3. A nondestructive readout magnetic memory apparatus comprising:

a magnetic core having a central aperture having a substantially high remanent-magnetization flux path thereabout for storing binary information in said core as a function of the direction of flux in said path,
at least one additional leg of said core having a substantially negligible remanent-magnetization,
said additional leg projecting from said central aperture's internal periphery across said central aperture and separated from an opposing portion of said core by an air gap, said leg providing magnetic coupling between opposing portions of said core,
writing means magnetically coupled to said path at its juncture with said leg,
sensing means magnetically coupled to said path in said air gap,
interrogate means magnetically coupled to said leg,
flux induced in said leg by said interrogate means causing a temporary alteration of the flux of said path adjacent said sensing means, said temporary alteration of the flux of said path adjacent said sensing means generating an output signal in said sensing means indicative of the binary information stored in said core.

4. A nondestructive readout magnetic memory apparatus comprising:
a magnetic core having a central aperture having a substantially high remanent-magnetization flux path thereabout for storing binary information in said core as a function of the direction of flux in said path,
at least two additional legs integral with said core each having a substantially negligible remanent-magnetization,
said additional legs projecting from said central aperture's periphery across said central aperture and providing magnetic coupling between opposing portions of said core,
writing means magnetically coupled to said path at its junctures with said legs,
sensing means magnetically coupled to said path intermediate its junctures with said legs,
interrogate means magnetically coupled to said legs,
flux induced in said legs by said interrogate means causing a temporary alteration of the flux of said path adjacent said sensing means, said temporary alteration of the flux of said path adjacent said sensing means generating an output signal in said sensing means indicative of the binary information stored in said core.

References Cited by the Examiner

UNITED STATES PATENTS 2,982,947 5/1961 Kilburn et al. -------- 340—174

BERNARD KONICK, *Primary Examiner.*

S. URYNOWICZ, *Assistant Examiner.*